United States Patent
Tomita et al.

(10) Patent No.: US 9,190,192 B2
(45) Date of Patent: Nov. 17, 2015

(54) CABLE HOLDER

(71) Applicant: HITACHI CABLE, LTD., Tokyo (JP)

(72) Inventors: Kazuhiko Tomita, Mito (JP); Nobuyuki Yamashita, Hitachi (JP); Masaaki Imahori, Hitachinaka (JP); Kenichi Egami, Kitaibaraki (JP)

(73) Assignee: Hitachi Metals, Ltd., Tokyo (JP)

( * ) Notice: Subject to any disclaimer, the term of this patent is extended or adjusted under 35 U.S.C. 154(b) by 132 days.

(21) Appl. No.: 13/776,764

(22) Filed: Feb. 26, 2013

(65) Prior Publication Data

US 2013/0220670 A1 Aug. 29, 2013

(30) Foreign Application Priority Data

Feb. 29, 2012 (JP) ................ 2012-044072

(51) Int. Cl.
*H01B 17/14* (2006.01)
*H02G 3/32* (2006.01)

(52) U.S. Cl.
CPC . *H01B 17/14* (2013.01); *H02G 3/32* (2013.01)

(58) Field of Classification Search
CPC .................. H01B 17/14; H02G 3/32
USPC ............ 174/659, 664, 665; 248/74.1
See application file for complete search history.

(56) References Cited

U.S. PATENT DOCUMENTS

| 5,992,802 A * | 11/1999 | Campbell ............ 248/68.1 |
| 2008/0087465 A1* | 4/2008 | Anderson ............ 174/72 A |
| 2011/0315830 A1* | 12/2011 | Eshima et al. ............ 248/74.1 |

FOREIGN PATENT DOCUMENTS

| JP | 2009-146768 A | 7/2009 |
| JP | 2012-010443 A | 1/2012 |

\* cited by examiner

*Primary Examiner* — Chau N Nguyen
*Assistant Examiner* — Paul McGee, III
(74) *Attorney, Agent, or Firm* — Roberts Mlotkowski Safran & Cole, PC

(57) ABSTRACT

A cable holder includes a pair of holding members that are relatively moved in a predetermined sliding direction to sandwich and hold a cable therebetween. The pair of holding members each include a plurality of guide planes each parallel to the sliding direction and a plurality of sliding contact surfaces parallel to the sliding direction. One of the pair of holding members is guided in the sliding direction by sliding the sliding contact surfaces thereof on the guide planes of the other holding member. The other holding member is guided in the sliding direction by sliding the sliding contact surfaces thereof on the guide planes of the one of the holding members. The pair of holding members are fixed to each other by a frictional force between the sliding contact surfaces and the guide planes in a state of holding the cable.

7 Claims, 9 Drawing Sheets

CABLE HOLDER

The present application is based on Japanese patent application No. 2012-044072 filed on Feb. 29, 2012, the entire contents of which are incorporated herein by reference.

BACKGROUND OF THE INVENTION

1. Field of the Invention

The invention relates to a cable holder for holding a cable such as electric wire.

2. Description of the Related Art

A conventional cable holding member is known, in which plurals wires are held apart from each other (see JP-A-2009-146768 and JP-A-2012-10443).

A wire holder disclosed in JP-A-2009-146768 is composed of a synthetic resin main component and an assembly component which are joined together such that a protruding piece formed on the main component is elastically deformed and engaged between plural plate portions formed on the assembly component. This wire holder is housed in a housing of a connector to hold wires extending from the housing.

A cable fixing member disclosed in JP-A-2012-10443 is composed of a pair of bracket members which are relatively rotated about fitting portions formed at respective longitudinal ends to sandwich and hold a cable. The bracket members are fixed to each other by a bolt inserted into insertion holes respectively formed thereon. This cable fixing member holds a middle portion of a cable to be wired and fixes the cable to a fixing target object by the bolt inserted into the insertion holes.

SUMMARY OF THE INVENTION

In the wire holder disclosed in JP-A-2009-146768, a load is applied to the protruding piece of the main component since the protruding piece elastically deforms at the time of assembling the main component with the assembly component of the wire holder. The load applied to the protruding piece may have an impact on the wire holder. This impact is remarkable especially in case that the wire holder is detached several times. In addition, since it is necessary to elastically deform the protruding piece, freedom of selecting a material of the protruding piece is limited.

In this regard, the load is less likely to be applied to the pair of bracket members in the cable fixing member disclosed in JP-A-2012-10443 proposed by the present inventors since it is not necessary to elastically deform the pair of bracket members at the time of assembly thereof. In this cable fixing member, it is not necessary to elastically deform the pair of bracket members but the bracket members are not fixed to each other without inserting the bolt into the insertion holes.

Accordingly, it is an object of the invention to provide a cable holder that allows plural members constituting the cable holder to be easily fixed to each other while suppressing deformation of these members.

(1) According to one embodiment of the invention, a cable holder comprises:

a pair of holding members that are relatively moved in a predetermined sliding direction to sandwich and hold a cable therebetween, wherein each of the pair of holding members comprises a plurality of guide planes each parallel to the sliding direction and a plurality of sliding contact surfaces parallel to the sliding direction, wherein one of the pair of holding members is guided in the sliding direction by sliding the plurality of sliding contact surfaces thereof on the plurality of guide planes of an other holding member, wherein the other holding member is guided in the sliding direction by sliding the plurality of sliding contact surfaces thereof on the plurality of guide planes of the one of the holding members, and wherein the pair of holding members are fixed to each other by a frictional force between the plurality of sliding contact surfaces and the plurality of guide planes in a state of holding the cable.

In the above embodiment (1) of the invention, the following modifications and changes can be made.

(i) Each of the pair of holding members comprises a flange having a guide surface parallel to the sliding direction, and wherein the pair of holding members are relatively movable in the sliding direction in a state that the guide surface of the one of the holding members is in surface-contact with the guide surface of the other holding member.

(ii) The one of the holding members and the other holding member have the same shape and size.

(iii) The flange of the one of the holding members and the flange of the other holding member each comprise a through-hole, the through-holes being communicated with each other when the pair of holding members sandwich and hold a cable, and wherein the pair of holding members are prevented from separating by fitting a fitting member into the through-hole.

Effects Of The Invention

According to one embodiment of the invention, a cable holder can be provided that allows plural members constituting the cable holder to be easily fixed to each other while suppressing deformation of these members.

BRIEF DESCRIPTION OF THE DRAWINGS

Next, the present invention will be explained in more detail in conjunction with appended drawings, wherein:

FIGS. 1A to 1F show a cable holder in a first embodiment of the present invention, wherein

FIGS. 2A to 2F show a first or second holding member constituting the cable holder, wherein

FIGS. 3A to 3C are explanatory diagrams illustrating a step of joining a first holding member 2 to a second holding member 3, wherein

FIGS. 4A to 4C are explanatory diagrams illustrating a step of sandwiching and holding wires between the first holding member and the second holding member, wherein

FIGS. 5A to 5D show a cable holder in a modification of the first embodiment of the invention, wherein

FIGS. 6A to 6F show a holding member in a second embodiment of the invention, wherein

FIGS. 8A to 8F show a holding member in a third embodiment of the invention, wherein

DETAILED DESCRIPTION OF THE PREFERRED EMBODIMENTS

First Embodiment

A configuration example of a cable holder in the first embodiment of the invention will be described below in reference to FIGS. 1A to 4C.

Figure 1A:
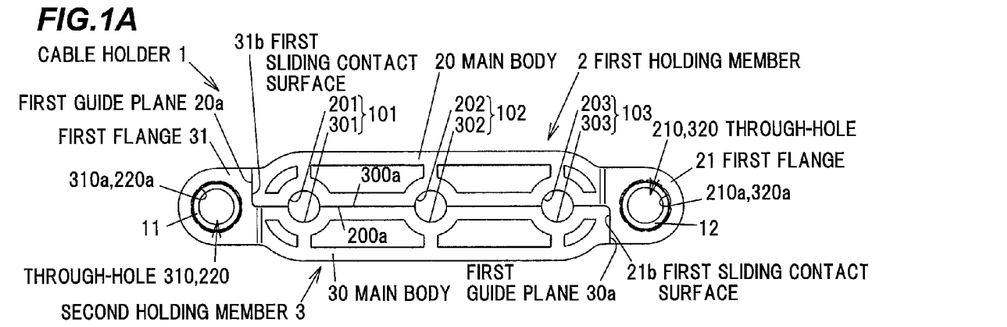
FIG. 1A is a plane view.
Figure 1B:
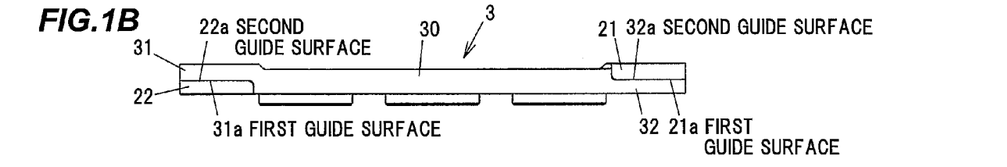
FIG. 1B is a front view.
Figure 1C:
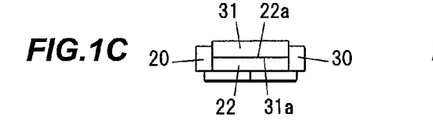
FIG. 1C is a left side view.
Figure 1D:
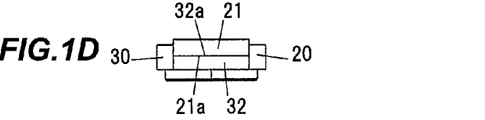
FIG. 1D is a right side view.
Figure 1E:
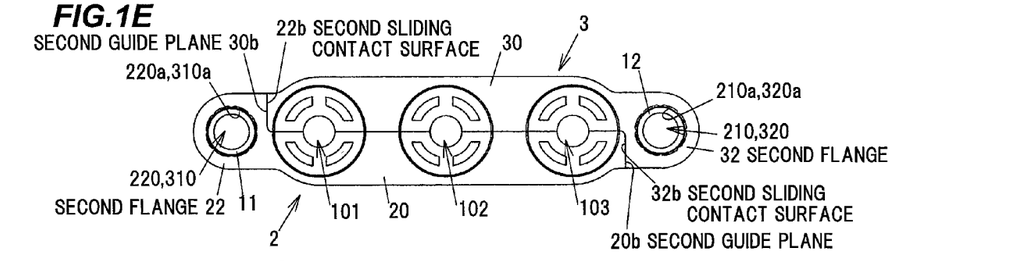
FIG. 1E is a bottom view and FIG. 1F is a perspective view.
Figure 1F:
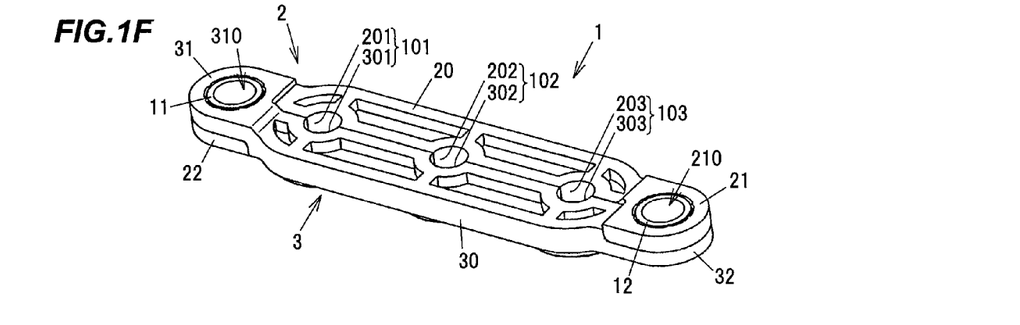
Figure 2A:
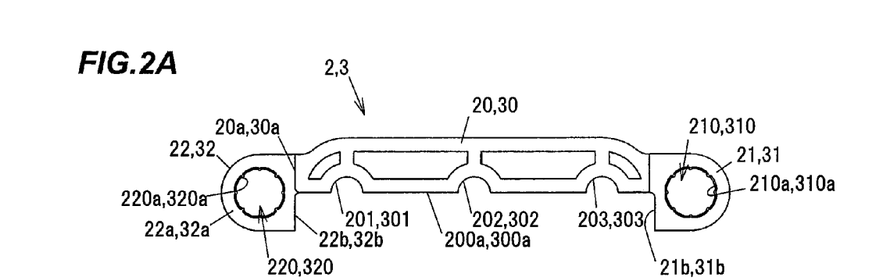
FIG. 2A is a plane view.
Figure 2B:
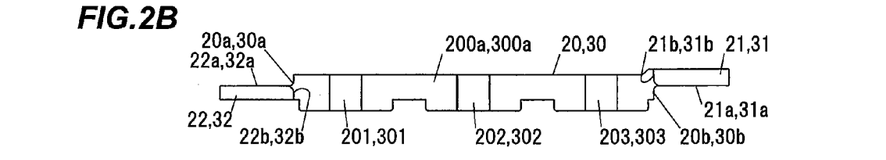
FIG. 2B is a front view.
Figure 2C:
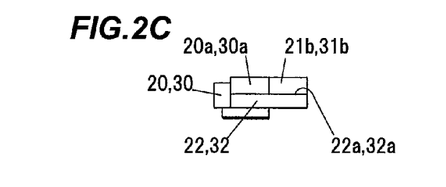
FIG. 2C is a left side view.
Figure 2D:
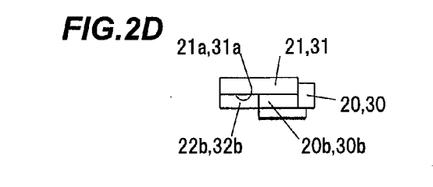
FIG. 2D is a right side view.
Figure 2E:
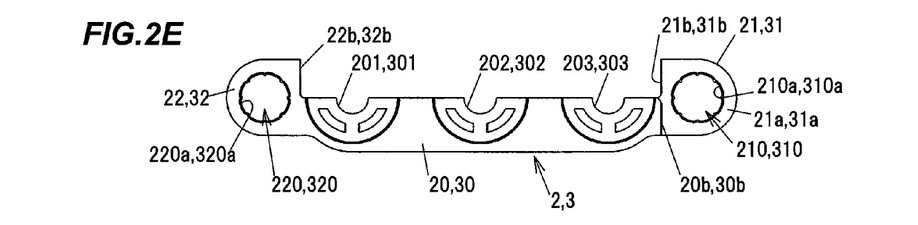
FIG. 2E is a bottom view and FIG. 2F is a perspective view.
Figure 2F:
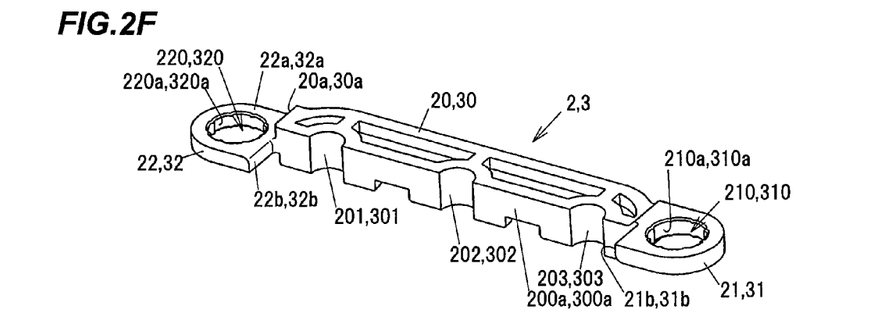

FIGS. 1A to 1F show a cable holder in the first embodiment of the invention, wherein FIG. 1A is a plane view, FIG. 1B is a front view, FIG. 1C is a left side view, FIG. 1D is a right side view, FIG. 1E is a bottom view and FIG. 1F is a perspective view. FIGS. 2A to 2F show a first or second holding member constituting the cable holder, wherein FIG. 2A is a plane view, FIG. 2B is a front view, FIG. 2C is a left side view, FIG. 2D is a right side view, FIG. 2E is a bottom view and FIG. 2F is a perspective view.

A cable holder 1 has a pair of holding members (the first holding member 2 and the second holding member 3) for sandwiching and holding three wires. The first holding member 2 and the second holding member 3 as a pair are joined and constitute the cable holder 1 in an integrated manner. The first holding member 2 and the second holding member 3 are relatively moved in a predetermined sliding direction and the cable holder 1 thereby sandwiches and holds the three wires between the first holding member 2 and the second holding member 3.

In the first embodiment, the first holding member 2 and the second holding member 3 are formed of a resin such as engineering plastic, e.g., PPS (polyphenylene sulfide), PBT (polybutylene terephthalate) or nylon, etc., and have the same shape and size by being manufactured using the same die. Therefore, in FIGS. 2A to 2F, the same drawings are used for explaining a structure of the first holding member 2 and that of the second holding member 3, and each portion is denoted by a reference numeral corresponding to the first holding member 2 as well as that corresponding to the second holding member 3. In detail, the leftmost digit is 2 in the reference numerals corresponding to the first holding member 2 and the leftmost digit is 3 in the reference numerals corresponding to the second holding member 3.

Next, the structures of the first holding member 2 and the second holding member 3 will be described in reference to FIGS. 2A to 2F. Although the reference numerals corresponding to the first holding member 2 will be mainly used in the explanation, the structure of the second holding member 3 is the same.

The first holding member 2 has a main body 20 for holding wires between itself and the second holding member 3, and a first flange 21 and a second flange 22 for attaching the cable holder 1 to an object.

The main body 20 has the planar surface 200a along a longitudinal direction thereof. On the planar surface 200a, three grooves 201, 202 and 203 which are concave in a direction orthogonal to the planar surface 200a are formed. The grooves 201, 202 and 203 have a semi-circular shape in a cross section along the longitudinal direction of the main body 20 as well as orthogonal to the planar surface 200a, and are formed at equal intervals in the longitudinal direction of the main body 20.

The first flange 21 is formed at a longitudinal end of the main body 20 and the second flange 22 is formed at another longitudinal end of the main body 20. The first flange 21 and the second flange 22 partially protrude beyond the planar surface 200a in a lateral direction which is orthogonal to the longitudinal direction of the main body 20. On the portion of the first flange 21 protruding beyond the planar surface 200a and the portion of the second flange 22 protruding beyond the planar surface 200a, a first sliding contact surface 21b and a second sliding contact surface 22b are formed facing each other. The first sliding contact surface 21b and the second sliding contact surface 22b are orthogonal to the planar surface 200a.

Meanwhile, a second guide plane 20b which is orthogonal to the longitudinal direction of the main body 20 is formed at an end portion of the main body 20 on the first flange 21 side. Likewise, a first guide plane 20a which is orthogonal to the longitudinal direction of the main body 20 is formed at an end portion of the main body 20 on the second flange 22 side. The first guide plane 20a and the second guide plane 20b are formed facing opposite directions from each other. In other words, the first guide plane 20a is formed facing toward the second flange 22 and the second guide plane 20b is formed facing toward the first flange 21. A curved surface-shaped chamfered portion formed by chamfering a corner is formed between the first guide plane 20a and the planar surface 200a. A curved surface-shaped chamfered portion formed by chamfering a corner is formed also between the second guide plane 20b and the planar surface 200a.

As shown in FIG. 2B, the positions of the first flange 21 and the second flange 22 in a thickness direction of the main body 20 are different from each other and the first flange 21 is formed at the higher level than the second flange 22 when the upper side in FIG. 2B is defined as a higher level and the lower side in FIG. 2B is defined as a lower level. In addition, the second guide plane 20b is formed at the lower level than the first flange 21 and the first guide plane 20a is formed at the higher level than the second flange 22. The positions of the first guide plane 20a and the first sliding contact surface 21b in the thickness direction of the main body 20 are the same. In addition, the positions of the second guide plane 20b and the second sliding contact surface 22b in the thickness direction of the main body 20 are the same.

The first flange 21 and the second flange 22 are flat plates respectively having guide surfaces 21a and 22a which are parallel to the longitudinal direction of the main body 20 and orthogonal to the planar surface 200a. The guide surface 21a is formed as a bottom surface of the first flange 21 on the lower side and the guide surface 22a is formed as a top surface of the first flange 21 on the upper side.

When the first holding member 2 and the second holding member 3 are joined, the first guide plane 20a, the second guide plane 20b, the first sliding contact surface 21b and the second sliding contact surface 22b of the first holding member 2 are respectively in surface-contact with a first sliding contact surface 31b, a second sliding contact surface 32b, a first guide plane 30a and a second guide plane 30b of the second holding member 3 as shown in FIGS. 1A and 1E. In addition, holding holes 101, 102 and 103 for holding wires are respectively formed by grooves 201 and 301, grooves 202 and 302, and grooves 203 and 303.

The through-hole 210 penetrating the first flange 21 in the thickness direction is formed on the first flange 21. Meanwhile, the through-hole 220 penetrating the second flange 22 in the thickness direction is formed on the second flange 22. Protrusions which protrude toward the centers of the through-holes 210 and 220 are formed at equal intervals on inner surfaces 210a and 220a of the through-holes 210 and 220.

Next, a step of assembling the first holding member 2 and the second holding member 3 will be described in reference to FIGS. 3A to 4C.

Figure 3A:
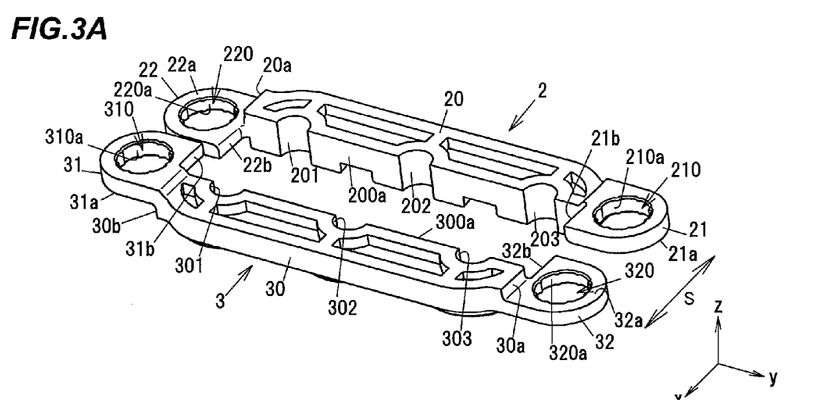
FIG. 3A shows a state in which the first holding member 2 and the second holding member 3 are arranged so that a planar surface 200*a* and a planar surface 300*a* face each other.
Figure 3B:
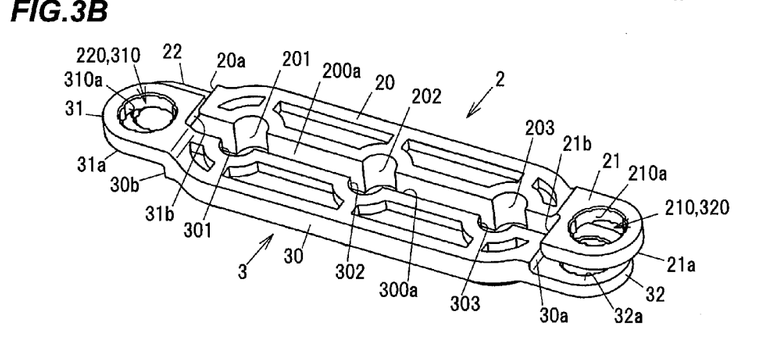
FIG. 3B shows a state in which the first holding member 2 and the second holding member 3 are relatively moved along a sliding direction S and FIG. 3C shows a state in which the first holding member 2 and the second holding member 3 are joined and fitting members 11 and 12 are being inserted into through-holes 210, 220, 310 and 320.
Figure 3C:
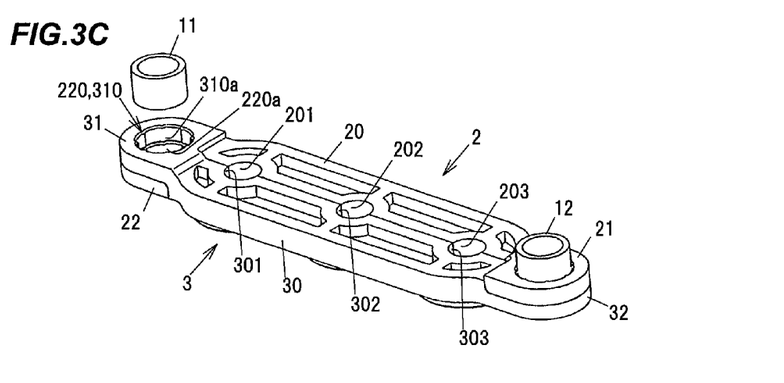

FIGS. 3A to 3C are explanatory diagrams illustrating a step of joining the first holding member 2 to the second holding member 3, wherein FIG. 3A shows a state in which the first holding member 2 and the second holding member 3 is arranged so that the planar surface 200a and the planar surface 300a face each other, FIG. 3B shows a state in which the first holding member 2 and the second holding member 3 are relatively moved along the sliding direction S and FIG. 3C shows a state in which the first holding member 2 and the second holding member 3 are joined and the fitting members 11 and 12 are being inserted into the through-holes 210, 220, 310 and 320.

Firstly, as shown in FIG. 3A, the first holding member 2 and the second holding member 3 are placed so that the planar surface 200a of the first holding member 2 and the planar surface 300a of the second holding member 3 face each other. Next, as shown in FIG. 3B, a second guide surface 32a (below) of the second holding member 3 is brought into surface-contact with a first guide surface 21a (above) of the first holding member 2 and, at the same time, a second guide surface 22a (below) of the first holding member 2 is brought into surface-contact with a first guide surface 31a (above) of the second holding member. As a result, it is easy to make the first guide plane 20a face the first sliding contact surface 31b, the second guide plane 20b face the second sliding contact surface 32b, the first guide plane 30a face the first sliding contact surface 21b and the second guide plane 30b face the second sliding contact surface 22b.

Next, the first holding member 2 and the second holding member 3 are relatively moved in the sliding direction S in a state that the first guide surface 21a is in surface-contact with the second guide surface 32a and the second guide surface 22a is in surface-contact with the first guide surface 31a. Here, the sliding direction S is a direction parallel to normal directions of the planar surfaces 200a and 300a. The first guide surfaces 21a, 31a and the second guide surfaces 22a, 32a are parallel to the sliding direction S.

When the first holding member 2 and the second holding member 3 are relatively moved in the sliding direction S, a front end portion of the first sliding contact surface 21b abuts against the chamfered portion formed between the first guide plane 30a and the planar surface 300a and a front end portion of the second sliding contact surface 22b abuts against the chamfered portion formed between the second guide plane 30b and the planar surface 300a. In addition, a front end portion of the first sliding contact surface 31b abuts against the chamfered portion formed between the first guide plane 20a and the planar surface 200a and a front end portion of the second sliding contact surface 32b abuts against the chamfered portion formed between the second guide plane 20b and the planar surface 200a. As a result, the planar surface 200a and the planar surface 300a face each other in parallel.

When the first holding member 2 and the second holding member 3 are further relatively moved in the sliding direction S, the first sliding contact surface 21b of the first holding member 2 comes into contact with the first guide plane 30a of the second holding member 3 and the second sliding contact surface 22b of the first holding member 2 comes into contact with the second guide plane 30b of the second holding member 3. Likewise, the first sliding contact surface 31b of the second holding member 3 comes into contact with the first guide plane 20a of the first holding member 2 and the second sliding contact surface 32b of the second holding member 3 comes into contact with the second guide plane 20b of the first holding member 2.

By the surface contact between the first guide surface 21a and the second guide surface 32a and that between the second guide surface 22a and the first guide surface 31a, relative positions of the first holding member 2 and the second holding member 3 are determined so that the first sliding contact surface 21b and the first guide plane 30a, the second sliding contact surface 22b and the second guide plane 30b, the first sliding contact surface 31b and the first guide plane 20a, and the second sliding contact surface 32b and the second guide plane 20b are located respectively in parallel to each other. The first holding member 2 and the second holding member 3 are relatively movable in the sliding direction in a state that the first guide surface 21a is in surface-contact with the second guide surface 32a and the second guide surface 22a is in surface-contact with first guide surface 31a, as described above.

Since each of the first guide planes 20a, 30a, the second guide planes 20b and 30b is parallel to the sliding direction S, the first sliding contact surface 21b and the second sliding contact surface 22b of the first holding member 2 are guided in the sliding direction S by sliding on the first guide plane 30a and the second guide plane 30b of the second holding member 3. Likewise, the first sliding contact surface 31b and the second sliding contact surface 32b of the second holding member 3 are guided in the sliding direction S by sliding on the first guide plane 20a and the second guide plane 20b of the first holding member 2.

The first holding member 2 and the second holding member 3 relatively move in the sliding direction S until the planar surface 200a abuts against the planar surface 300a. The first holding member 2 and the second holding member 3 as a pair are fixed to each other mainly by a frictional force between the first sliding contact surface 21b and the first guide plane 30a, between the first sliding contact surface 31b and the first guide plane 20a, between the second sliding contact surface 22b and the second guide plane 30b and between the second sliding contact surface 32b and the second guide plane 20b. Therefore, the first holding member 2 and the second holding member 3 are joined and fixed in a state that the planar surface 200a of the first holding member 2 abuts against the planar surface 300a of the second holding member 3. Note that, in the first embodiment, an auxiliary frictional force acts between the first guide surface 21a and the second guide surface 32a and between the first guide surface 31a and the second guide surface 22a, which contributes to fix the first holding member 2 to the second holding member 3.

In addition, by the relative movement of the first holding member 2 and the second holding member 3 in the sliding direction S, the through-hole 210 of the first holding member 2 and the through-hole 320 of the second holding member 3 are communicated with each other. Likewise, the through-hole 220 of the first holding member 2 and the through-hole 310 of the second holding member 3 are also communicated with each other. The cylindrical fitting members 11 and 12 are inserted into the through-holes 220, 310 and the through-holes 210, 320 which are respectively communicated when the first holding member 2 and the second holding member 3 as a pair are joined, and the fitting members 11 and 12 are respectively internally fitted to inner surfaces 210a, 220a, 310a and 320a of the through-holes. The internal fitting of the fitting members 11 and 12 into the through-holes 220, 310 and the through-holes 210, 320 prevents the pair of the first holding member 2 and the second holding member 3 from separating from each other.

Figure 4A:
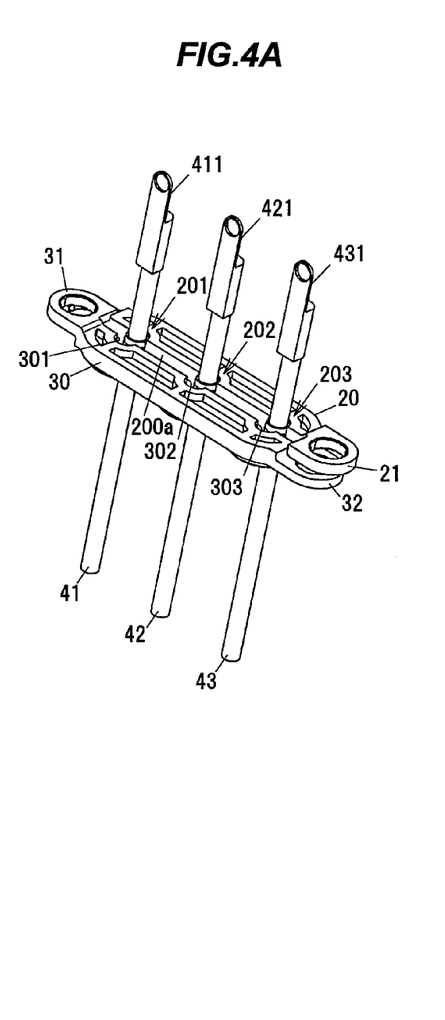
FIG. 4A shows a state in which the wires are arranged between the first and second holding members so that planar surfaces face each other.
Figure 4B:
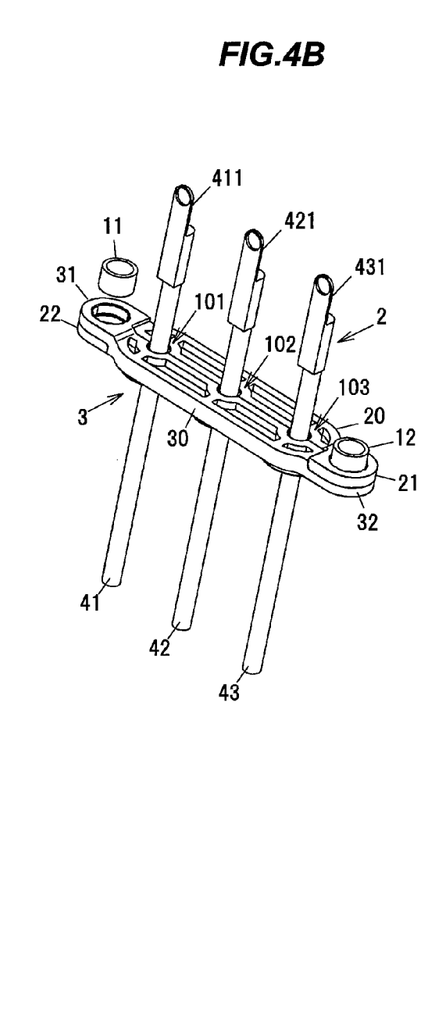
FIG. 4B shows a state in which the wires are sandwiched and held by the first and second holding members and the fitting members are being inserted into the though-holes and FIG. 4C shows a state in which the wires are sandwiched and held between first and second holding members and bolts are being inserted into the though-holes.
Figure 4C:
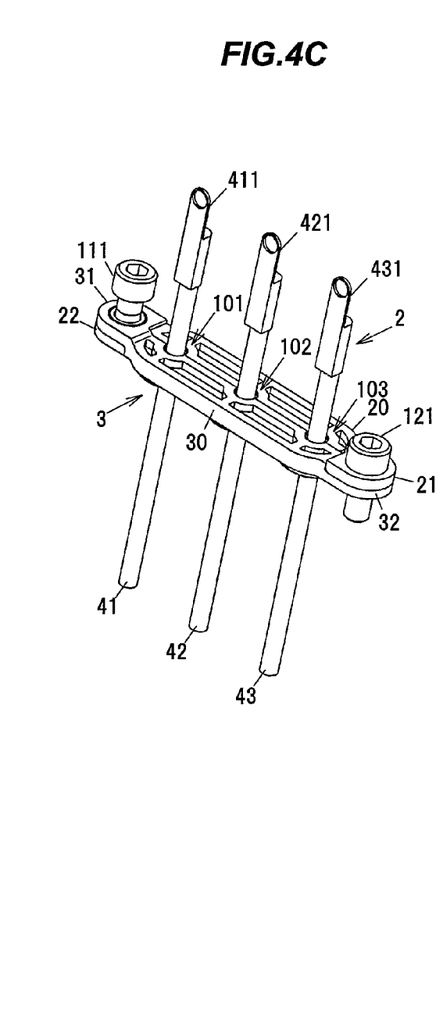

Next, a step of sandwiching and holding wires 41, 42 and 43 by the cable holder 1 will be described. FIGS. 4A to 4C are explanatory diagrams illustrating a step of sandwiching and holding the wires 41, 42 and 43 between the first holding member 2 and the second holding member 3, wherein FIG. 4A shows a state in which the wires 41, 42 and 43 are arranged between the first holding member 2 and the second holding member 3 so that the planar surface 200a and the planar surface 300a face each other, FIG. 4B shows a state in which the wires 41, 42 and 43 are sandwiched and held by first holding member 2 and the second holding member 3 and the fitting members 11 and 12 are being inserted into the though-holes 210, 220, 310 and 320 and FIG. 4C shows a state in which the wires 41, 42 and 43 are sandwiched and held between first holding member 2 and the second holding member 3 and bolts 111 and 121 are being inserted into the though-holes 210, 220, 310 and 320.

Terminals 411, 421 and 431 are provided at end portions of the wires 41, 42 and 43 for electrical connection thereof. The three wires 41, 42 and 43 are arranged respectively between the grooves 201, 202 and 203 of the first holding member 2 and the grooves 301, 302 and 303 of the second holding member 3 which respectively face each other.

In the same manner as FIGS. 3A to 3C in which the wires are not sandwiched and held, the sliding contact surfaces of the first holding member 2 and the second holding member 3 (the first sliding contact surfaces 21b, 31b and the second sliding contact surfaces 22b, 32b) are relatively moved with respect to the guide planes of the first holding member 2 and the second holding member 3 (the first guide planes 20a, 30a and the second guide planes 20b, 30b) along the sliding direction. Then, the planar surface 200a abuts against the planar surface 300a, thereby positioning the first holding member 2 and the second holding member 3 in the sliding direction. In this state, the wire 41 is sandwiched and held between the grooves 201 and 301, the wire 42 between the grooves 202 and 302, and the wire 43 between the grooves 203 and 303. Accordingly, the wires 41, 42 and 43 are sandwiched and held between the pair of the first holding member 2 and the second holding member 3, and in this state, the first holding member 2 and the second holding member 3 are fixed to each other.

By respectively internally fitting the fitting members 11 and 12 into the communicated through-holes 310, 220 and the communicated through-holes 210, 320 after sandwiching and holding the wires 41, 42 and 43 between the pair of the first holding member 2 and the second holding member 3, separation of the first holding member 2 from the second holding member 3 is suppressed and the wires 41, 42 and 43 are surely sandwiched and held by the cable holder 1.

The cable holder 1 is attached to an object by the bolts 111 and 121 inserted into the through-holes 310, 220 and the through-holes 210, 320 in which the fitting members 11 and 12 are internally fitted. The terminals 411, 421 and 431 of the wires 41, 42 and 43 are respectively attached to terminal blocks of the object.

Functions and Effects of the First Embodiment (1) In the cable holder 1, the components are less deformed at the time of assembling the first holding member 2 and the second holding member 3. Therefore, it is possible to reduce a load applied to the components due to deformation thereof.

(2) Since the sliding contact surfaces respectively slide along the guide planes at the time of assembling the first holding member 2 and the second holding member 3, it is possible to assemble in a certain assembling direction. Therefore, it is possible to reduce the load applied to the components. In addition, since the first holding member 2 and the second holding member 3 are fixed by a frictional force between the respective guide planes and sliding contact surfaces, fixation between the components can be facilitated.

(3) Since the flange has the guide surface, relative positions of the holding members are determined so that the guide planes and the sliding contact surfaces thereof are in parallel. Therefore, it is possible to prevent the holding members from separating from each other.

(4) Since the first holding member 2 and the second holding member 3 are the same member and the cable holder 1 is thus composed of one type of component, it is possible to reduce the cost of the cable holder 1.

(5) Since the first holding member 2 and the second holding member 3 are the same member and are manufactured using the same die, it is possible to prevent a frictional force applied to the respective sliding contact surfaces and guide planes from varying depending on a product.

(6) By internally fitting the fitting members into the through-holes which are formed on the flanges in a direction perpendicular to the sliding direction S, it is possible to easily prevent the holding members from separating from each other without bolting, etc.

Modification of the First Embodiment

Figure 5A:
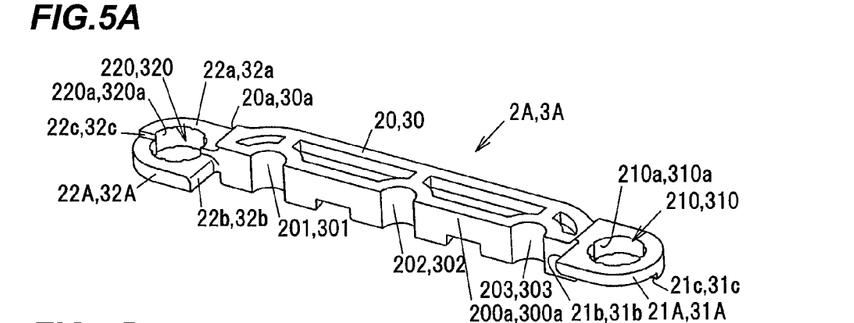
FIG. 5A is a perspective view showing a holding member.
Figure 5B:
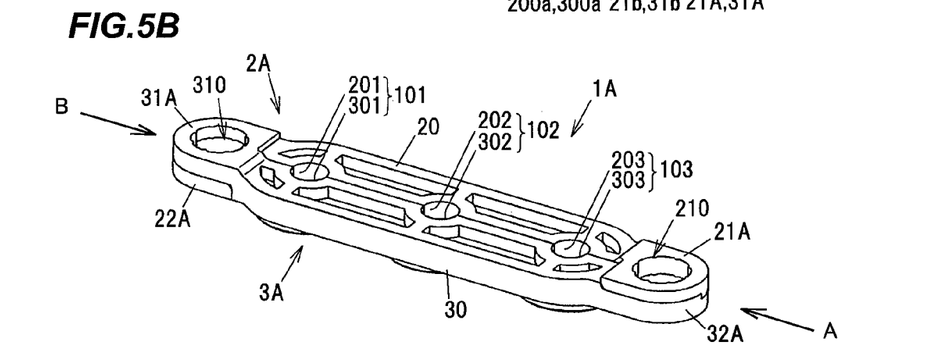
FIG. 5B is a perspective view showing the cable holder.
Figure 5C:
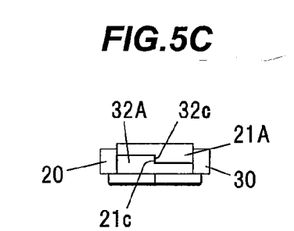
FIG. 5C is a side view showing the cable holder as viewed from the viewpoint A and FIG. 5D is a side view showing the cable holder as viewed from the viewpoint B.
Figure 5D:
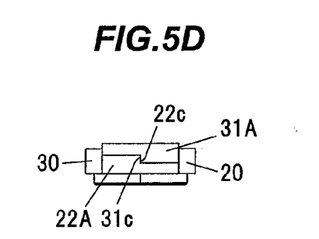

Next, a modification of the first embodiment of the invention will be described in reference to FIGS. 5A to 5D. FIGS. 5A to 5D show a cable holder 1A in a modification of the first embodiment of the invention, wherein FIG. 5A is a perspective view showing a holding member 2A or 3A, FIG. 5B is a perspective view showing the cable holder 1A, FIG. 5C is a side view showing the cable holder 1A as viewed from the viewpoint A and FIG. 5D is a side view showing the cable holder 1A as viewed from the viewpoint B.

While the first guide surfaces 21a, 31a and the second guide surfaces 22a, 32a of the first flanges 21, 31 and second flanges 22, 32 are flat surfaces in the first embodiment, the cable holder 1A in the modification of the first embodiment has level differences 21c, 22c, 31c and 32c formed on the first guide surfaces 21a, 31a and the second guide surfaces 22a, 32a. The remaining configuration is the same as the cable holder 1 in the first embodiment.

First flanges 21A and 31A are formed so that surfaces of protruding portions of the first guide surfaces 21a and 31a are lower than surfaces of the remaining portions of the first guide surfaces 21a and 31a. The level differences 21c and 31c are formed between the surfaces of the protruding portions of the first guide surfaces 21a and 31a and the surfaces of the remaining portions thereof. The level differences 22c and 32c are also formed on the second guide surfaces 22a and 32a of the second flanges in the same manner.

When the first holding member 2A is assembled with the second holding member 3A, the level difference 21c abuts against the level difference 32c and the level difference 22c abuts against the level difference 31c. This determines the positions of the first holding member 2A and the second holding member 3A in the sliding direction S of assembly, and the relative movement thereof in the sliding direction S of assembly is restricted.

In the modification of the first embodiment, in addition to the functions and effects described in the first embodiment, it is possible to determine the positions of the first holding member 2A and the second holding member 3A in the sliding direction S of assembly by forming the level differences 21c, 22c, 31c and 32c even if there is a gap between the planar surface 200a and the planar surface 300a.

Second Embodiment

Figure 6A:
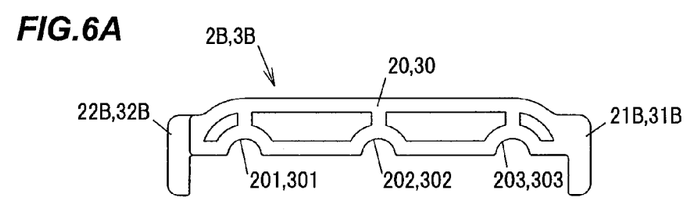
FIG. 6A is a plane view.
Figure 6B:
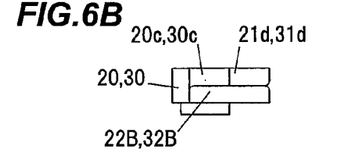
FIG. 6B is a left side view.
Figure 6C:
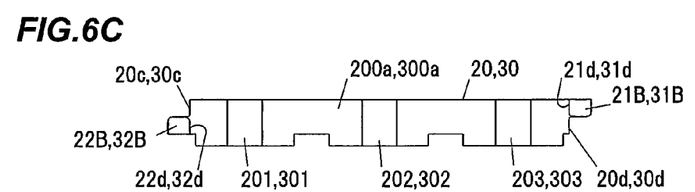
FIG. 6C is a front view.
Figure 6D:
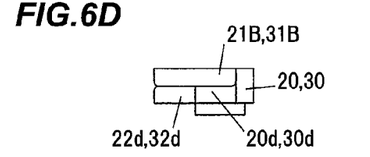
FIG. 6D is a right side view.
Figure 6E:
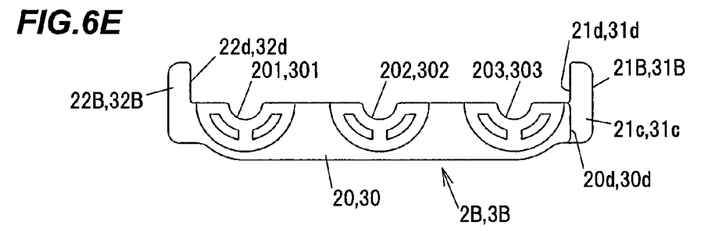
FIG. 6E is a bottom view and FIG. 6F is a perspective view.
Figure 6F:
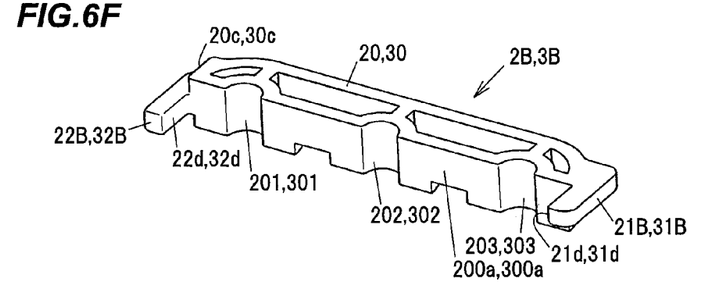
Figure 7A:
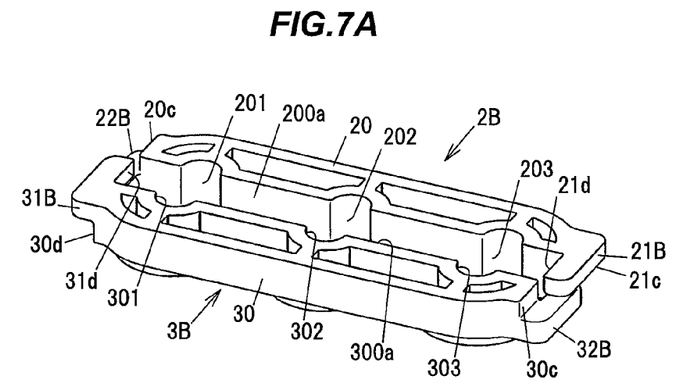
FIGS. 7A and 7B are diagrams illustrating assembly of the first and second holding members.
Figure 7B:
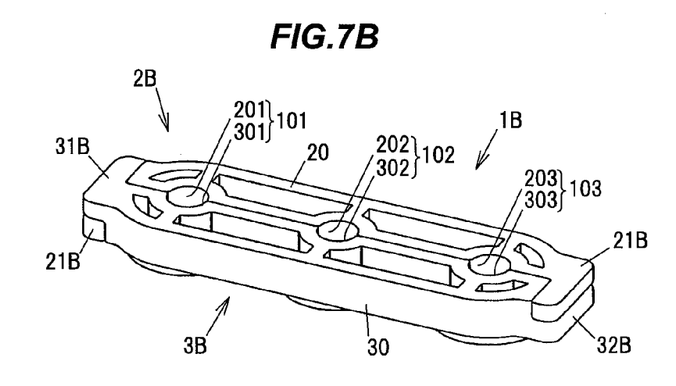

Next, the second embodiment of the invention will be described in reference to FIGS. 6A to 7B. FIGS. 6A to 6F show a holding member 2B or 3B in the second embodiment of the invention, wherein FIG. 6A is a plane view, FIG. 6B is a left side view, FIG. 6C is a front view, FIG. 6D is a right side view, FIG. 6E is a bottom view and FIG. 6F is a perspective view. FIGS. 7A and 7B are diagrams illustrating assembly of the first holding member 2B and the second holding member 3B.

While the through-holes 210, 220, 310 and 320 are formed on the first flanges 21, 31 and the second flanges 22, 32 in the first embodiment, first flanges 21B, 31B and second flanges 22B, 32B in a cable holder 1B of the second embodiment do not have through-holes and have a different shape. The remaining configuration is the same as the cable holder 1 in the first embodiment.

The first flanges 21B, 31B and the second flanges 22B, 32B of the second embodiment have a rectangular shape protruding in the sliding direction S of assembling the first holding member 2B and the second holding member 3B. First sliding contact surfaces 21d, 31d and second sliding contact surfaces 22d, 32d which slide on first guide planes 20c, 30c and second guide planes 20d, 30d are formed on the first flanges 21B, 31B and the second flanges 22B, 32B so as to be parallel to the sliding direction S in the same manner as the first embodiment.

In the second embodiment, in addition to the functions and effects described in the first embodiment except the function and effect (5) about the through-hole, the first flanges 21B, 31B and the second flanges 22B, 32B are downsized by not forming the through-holes thereon. Therefore, it is possible to downsize the cable holder 1B by not forming through-holes on the first flanges 21B, 31B and the second flanges 22B, 32B.

Third Embodiment

Figure 8A:
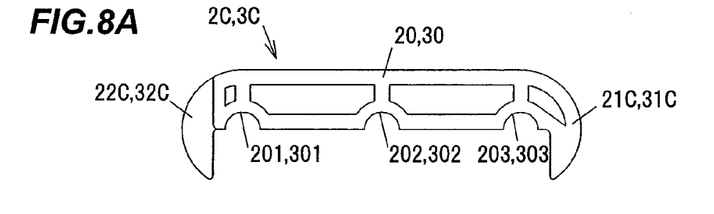
FIG. 8A is a plane view.
Figure 8B:
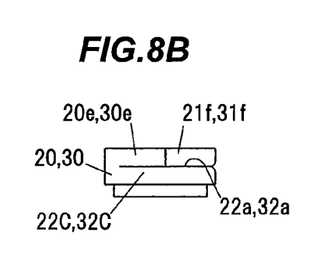
FIG. 8B is a left side view.
Figure 8C:
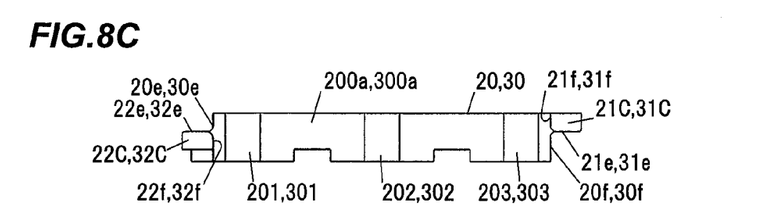
FIG. 8C is a front view.
Figure 8D:
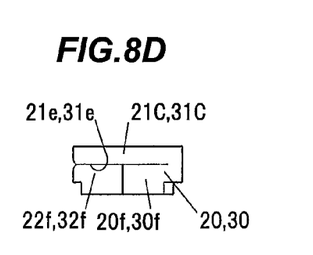
FIG. 8D is a right side view.
Figure 8E:
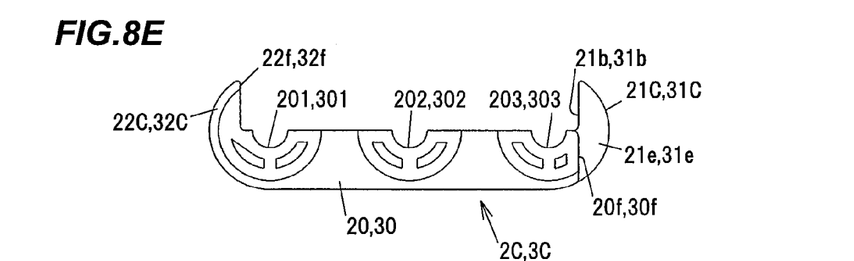
FIG. 8E is a bottom view and FIG. 8F is a perspective view.
Figure 8F:
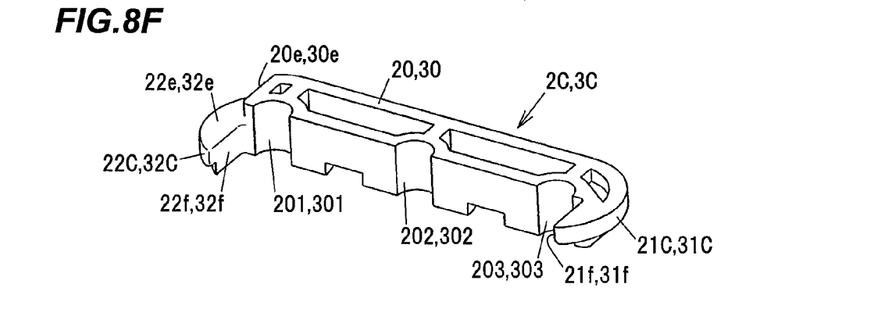
Figure 9A:
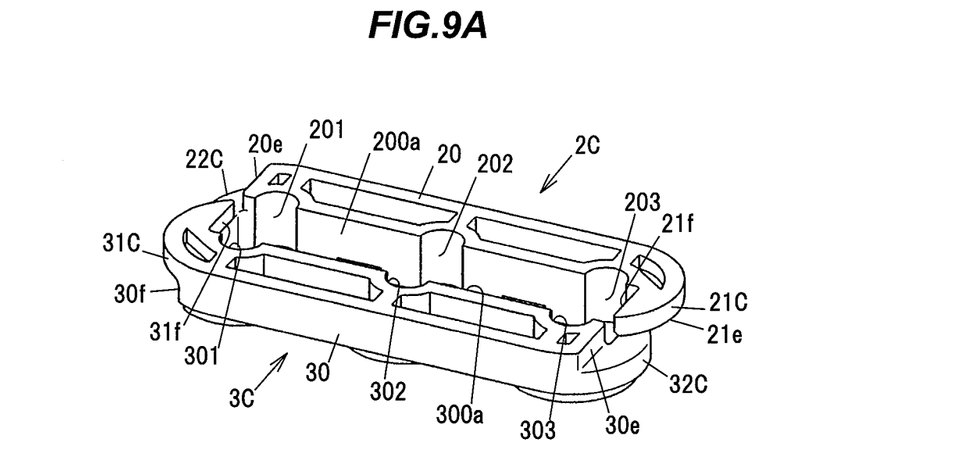
FIGS. 9A and 9B are diagrams illustrating assembly of the first and second holding members.
Figure 9B:
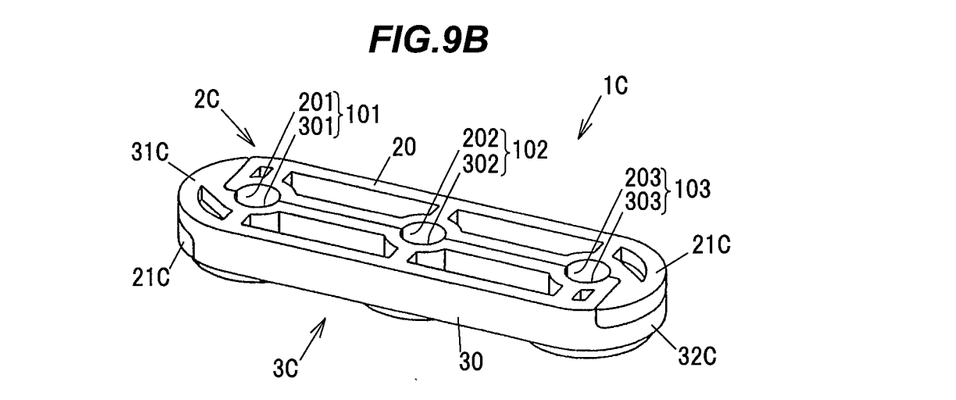

Next, the third embodiment of the invention will be described in reference to FIGS. 8A to 9B. FIGS. 8A to 8F show a holding member 2C or 3C in the third embodiment of the invention, wherein FIG. 8A is a plane view, FIG. 8B is a left side view, FIG. 8C is a front view, FIG. 8D is a right side view, FIG. 8E is a bottom view and FIG. 8F is a perspective view. FIGS. 9A and 9B are diagrams illustrating assembly of the first holding member 2C and the second holding member 3C.

First flanges 21C, 31C and second flanges 22C, 32C in a cable holder 1C of the third embodiment do not have through-holes in the same manner as the second embodiment, and have a different shape. The remaining configuration is the same as the cable holder 1 in the first embodiment.

The first flanges 21C, 31C and the second flanges 22C, 32C in the third embodiment have a shape composed of a straight portion on the main body 20 or 30 side and a circular arc portion on the opposite side. The first flanges 21C, 31C and the second flanges 22C, 32C protrude in the sliding direction S of assembling the first holding member 2C and the second holding member 3C. First sliding contact surfaces 21f, 31f and second sliding contact surfaces 22f, 32f which slide on first guide planes 20e, 30e and second guide planes 20f, 30f are formed on the first flanges 21C, 31C and the second flanges 22C, 32C so as to be parallel to the sliding direction S in the same manner as the first embodiment.

In the third embodiment, it is possible to obtain the same functions and effects as those described in the second embodiment.

Although the embodiments of the invention have been described, the invention according to claims is not to be limited to the above-mentioned embodiments. Further, please note that all combinations of the features described in the embodiments are not necessary to solve the problem of the invention.

In addition, the invention can be appropriately modified and implemented without departing the gist of the invention. For example, the first and second holding members are the same member in the embodiments but do not need to be the same member.

In addition, although the example in which the first and second holding members each have one first flange and one second flange at the both end portions has been described, plural first and second flanges may be provided at the both end portions of the first and second holding members.

In addition, although the case of forming three holding holes on the cable holder has been described, the number of the holding holes (grooves) is not limited. The number of the wires to be sandwiched and held does not necessarily need to be three as long as it is not more than the number of sandwiching/holding portions provided on the cable holder.

In addition, the cable holder may be attached to the object by inserting, not the fitting members, but bolts into the through-holes.

In addition, although the wire has been described as an example of the cable, the cable may be, in detail, a cable having a power line for supplying electrical power, a cable having a signal line for transmitting a signal, or a cable having power and signal lines, etc.

In addition, the invention can be suitably used for, e.g., cables used in an environment subjected to severe vibration without limiting to the cable for vehicle.

What is claimed is:

1. A cable holder, comprising:
a pair of holding members that are moved relative to each other in a predetermined sliding direction to sandwich and hold a cable therebetween,
wherein each of the pair of holding members comprises a plurality of guide planes parallel to the sliding direction and a plurality of sliding contact surfaces parallel to the sliding direction,
wherein one of the pair of holding members is guided in the sliding direction by sliding the plurality of sliding contact surfaces thereof on the plurality of guide planes, respectively, of another holding member,
wherein the other holding member is guided in the sliding direction by sliding the plurality of sliding contact surfaces thereof on the plurality of guide planes, respectively, of the one holding member, and
wherein the pair of holding members are fixed to each other with the cable held therebetween by a frictional force in the sliding direction due to an increasing overlapping surface contact between the plurality of sliding contact surfaces and the plurality of guide planes, respectively, as the pair of holding members are slid together, wherein the pair of holding members each comprise a flange having a guide surface parallel to the sliding direction, and wherein the pair of holding members are relatively movable in the sliding direction in a state that the guide surface of the one of the holding members is in surface-contact with the guide surface of the other holding member, and wherein the guide surfaces of the flanges of the pair of holding members include stepped portions respectively, and the pair of holding members are positioned in the sliding direction in such a manner that the respective stepped portions of the pair of holding members are butted together.

2. The cable holder according to claim 1, wherein the one of the holding members and the other holding member have the same shape and size.

3. The cable holder according to claim 1, wherein the flange of the one of the holding member and the flange of the other holding member each comprise a through-hole, the through-holes being communicated with each other when the pair of holding members sandwich and hold a cable, and wherein the pair of holding members are prevented from separating by fitting a fitting member into the through-hole.

4. The cable holder according to claim 2, wherein the pair of holding members are manufactured with the same molds.

5. The cable holder according to claim 3, wherein the through-holes of the flanges of the pair of holding members are formed perpendicular to the sliding direction.

6. The cable holder according to claim 2, further including bolts, which are inserted in the through-holes of the flanges of the pair of holding members respectively, for the holding members to be attached to an object.

7. The cable holder according to claim 1, wherein the pair of holding members are held together only by said frictional force.

* * * * *